(12) United States Patent
Valenti et al.

(10) Patent No.: US 11,527,874 B1
(45) Date of Patent: Dec. 13, 2022

(54) WIRE TOOL FOR STRIPPING AND TERMINATING ELECTRICAL WIRES AND METHODS OF USING THE SAME

(71) Applicant: Araspeed Tool Company LLC, North Kingstown, RI (US)

(72) Inventors: Thomas J. Valenti, North Kingstown, RI (US); Leo F. Valenti, East Greenwich, RI (US); Gregory J. Phipps, North Kingstown, RI (US)

(73) Assignee: Araspeed Tool Company LLC, North Kingstown, RI (US)

( * ) Notice: Subject to any disclaimer, the term of this patent is extended or adjusted under 35 U.S.C. 154(b) by 0 days.

(21) Appl. No.: 17/851,746

(22) Filed: Jun. 28, 2022

(51) Int. Cl.
*H02G 1/12* (2006.01)
*H01R 4/12* (2006.01)
*B21F 7/00* (2006.01)

(52) U.S. Cl.
CPC .............. *H02G 1/1214* (2013.01); *B21F 7/00* (2013.01); *H01R 4/12* (2013.01); *H02G 1/1224* (2013.01)

(58) Field of Classification Search
USPC ............................................................ D8/98
See application file for complete search history.

(56) References Cited

U.S. PATENT DOCUMENTS

| | | |
|---|---|---|
| 2,668,464 A | 2/1954 | Paules |
| 3,608,401 A | 9/1971 | Freed |
| 3,946,487 A | 3/1976 | Bieganski |
| 4,366,619 A | 1/1983 | Bieganski |
| 4,368,654 A | 1/1983 | Kober |
| 4,472,877 A | 9/1984 | Undin |
| 4,519,278 A | 5/1985 | Heldt |
| 4,526,068 A | 7/1985 | Undin |
| 4,640,009 A | 2/1987 | Liversidge |
| 4,776,672 A | 8/1988 | Undin |
| D297,910 S | 10/1988 | Mathews |
| 5,009,130 A | 4/1991 | Bieganski |
| 5,036,578 A | 8/1991 | Rivera |
| 5,205,006 A | 4/1993 | Panasuk |
| 5,323,502 A | 6/1994 | Miller |
| 5,325,587 A * | 7/1994 | Steiner ................. H02G 1/1224 30/91.2 |
| 5,345,681 A | 9/1994 | Undin |
| 5,381,601 A | 1/1995 | Danter |
| 5,398,413 A | 3/1995 | Chen |
| 6,253,641 B1 * | 7/2001 | Tarpill ................. H02G 1/1224 30/90.6 |
| 7,137,204 B2 * | 11/2006 | Wiste ................... H02G 1/1214 30/90.1 |
| 7,243,429 B2 | 7/2007 | Landes |
| D664,417 S * | 7/2012 | Still ................................ D8/98 |
| D692,288 S * | 10/2013 | Locklear .......................... D8/98 |

(Continued)

FOREIGN PATENT DOCUMENTS

EM 002691014-0001 5/2015
EM 002691014-0002 5/2015

*Primary Examiner* — Hwei-Siu C Payer
(74) *Attorney, Agent, or Firm* — Barlow, Josephs & Holmes, Ltd.; Stephen J. Holmes

(57) ABSTRACT

A multi-purpose wire tool which is capable of slitting and cutting the outer insulation sheath of commonly used 12/2 and 14/2 gauge multi-conductor insulated electrical cabling (Romex-style cable), as well as stripping, twisting, capping and hooking the individual insulated wires for both rough-in and finish electrical trim work.

21 Claims, 5 Drawing Sheets

(56) References Cited

U.S. PATENT DOCUMENTS

| | | | |
|---|---|---|---|
| 9,225,152 B2 | 12/2015 | Anderson | |
| D749,391 S * | 2/2016 | Payne | D8/98 |
| D758,159 S | 6/2016 | Valenti | |
| D792,185 S * | 7/2017 | Valenti | D8/98 |
| 10,076,829 B2 | 9/2018 | Sun | |
| D859,121 S * | 9/2019 | Zahorski | D8/98 |
| 2003/0110637 A1* | 6/2003 | Tapper | H02G 1/1224 30/90.1 |
| 2008/0053558 A1* | 3/2008 | Rodriguez | H01R 4/12 140/118 |
| 2009/0013477 A1 | 1/2009 | Agronin | |
| 2009/0308483 A1* | 12/2009 | James | B21F 7/00 140/120 |
| 2017/0279254 A1* | 9/2017 | Nelson | H02G 1/1226 |

* cited by examiner

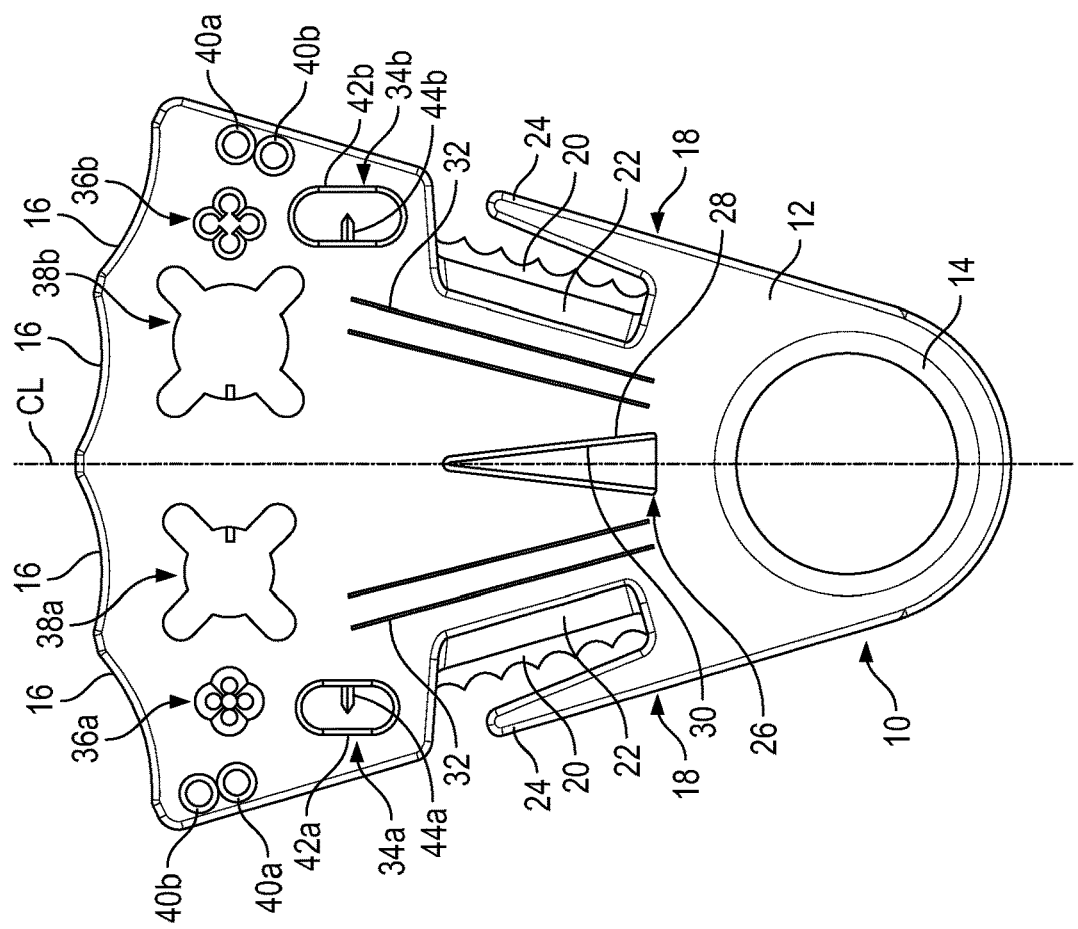
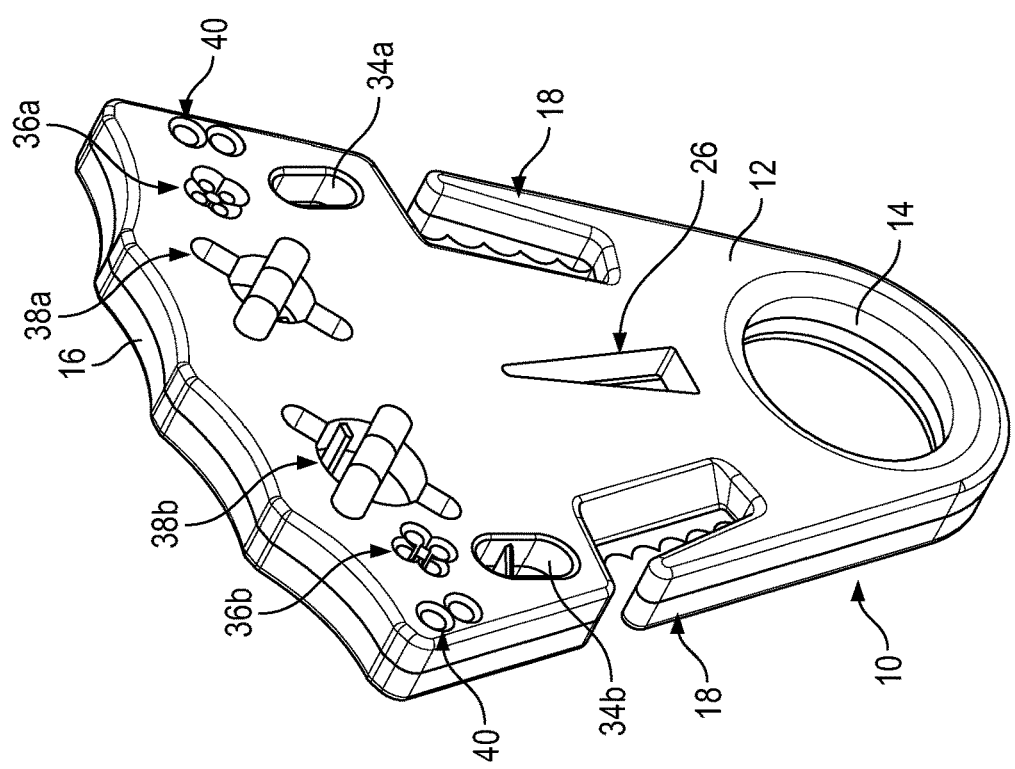

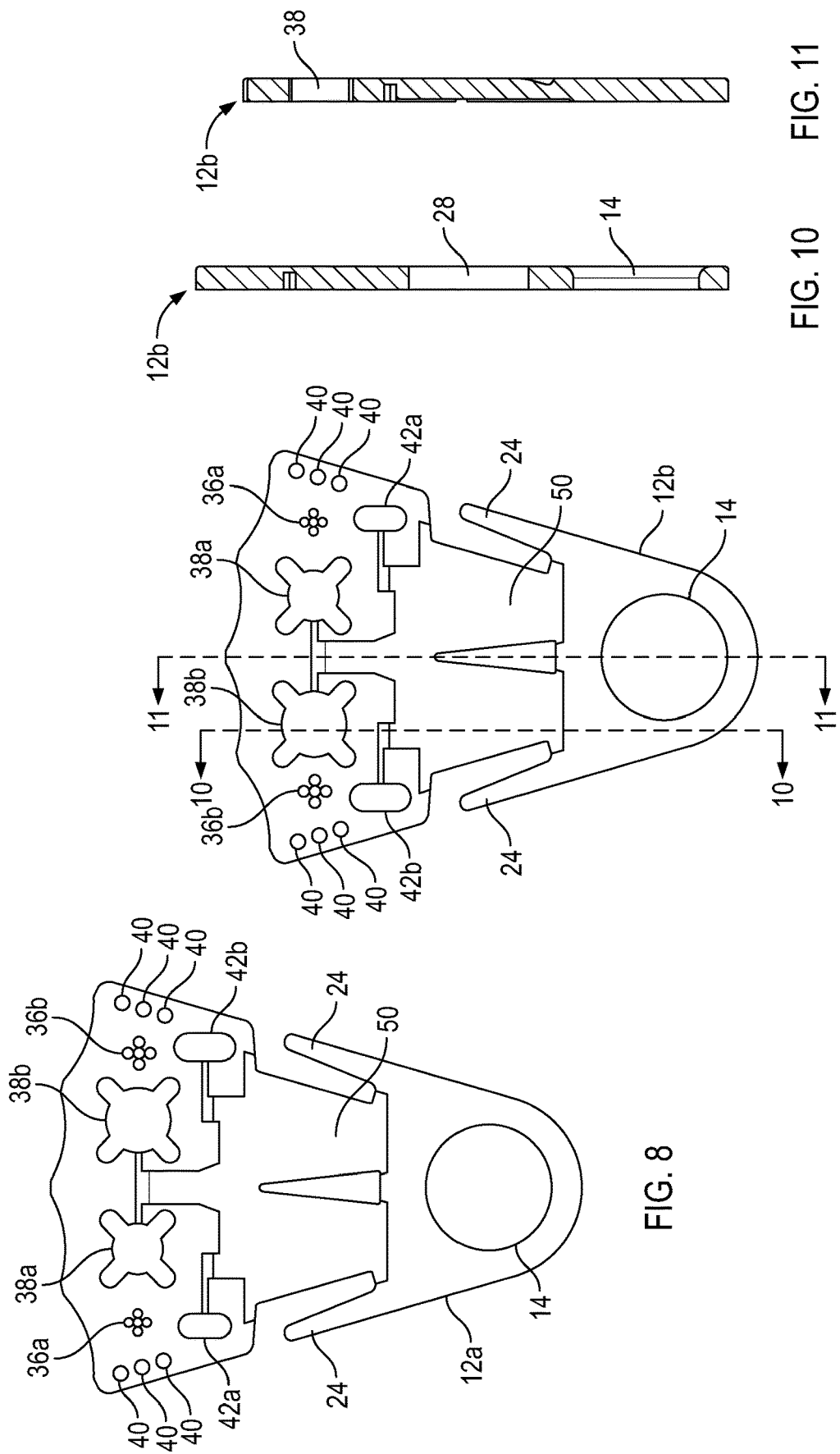

WIRE TOOL FOR STRIPPING AND TERMINATING ELECTRICAL WIRES AND METHODS OF USING THE SAME

BACKGROUND OF THE DISCLOSURE

The present disclosure relates generally to wire tools for electricians and more particularly to a multi-purpose wire tool which is capable of slitting and cutting the outer insulation sheath of commonly used 12/2 and 14/2 gauge multi-conductor insulated electrical cabling (Romex-style cable), as well as stripping, twisting, capping and hooking the individual insulated wires for both rough-in and finish electrical trim work.

Wire cutting and stripping tools are well known in the art and typically comprise opposed jaw type tools with varying holes and gripping surfaces for manipulating the wires.

Trimming electrical boxes consists essentially of 5 basic steps:
- slitting the outer sheath or casing
- cutting the excess sheath and paper wrap from the cable to expose the individual wires
- stripping the individual hot and neutral wires
- twisting the grouped ground, hot and neutral wires (wire sets) together
- capping the twisted wire sets
- hooking/looping the terminal ends of lead wires for connection to the electrical device.

The first two steps involve cutting using a standard utility knife with a large, sharp exposed blade. This is a known safety hazard resulting in many injuries which impede or prevent work.

The later three steps require a significant amount of wire manipulation and twisting, typically with pliers which involves repeated twisting of the wrist, which is a known source of injury to many professional electricians.

While many of the existing wire tools make some of the work for stripping the wires easier, there is no existing tool that can handle all of the basic steps for roughing out and terminating electrical cable and wires.

SUMMARY OF THE DISCLOSURE

The present disclosure provides a unique and novel multi-purpose wire tool that is easy to use, that reduces arm and hand fatigue, that reduces the number of tool changes making work faster, that shrouds dangerous knife edges, and which is electrically insulated to protect against electrical shocks.

The multi-purpose wire tool is capable of slitting and cutting the outer insulation sheath of commonly used 12/2 and 14/2 gauge multi-conductor insulated electrical cabling (Romex™-style cable), as well as stripping, twisting, capping and hooking the individual insulated wires for both rough-in and finish electrical trim work.

The wire tool comprises a generally triangular-shaped planar body having a circular rotation hole formed adjacent the apex end and a plurality of contoured indents formed at the base end thereof.

The rotation hole is strategically placed in the tool to allow the user to insert a thumb into the hole and to rotate the body with a circular motion to cut, twist, and engage the wires to fully utilize the features of this device. This operation will become apparent as further features are discussed herein.

The contoured finger indents allow the fingers to hold the body securely when the users thumb is in the rotation hole and allows for the user to rotate and rock the assembly to cut, twist, and engage the wires. These finger indentations enable tactile feel that confirms proper holding of the tool for either left-hand or right-hand wire tool operators. It also aids in the removal of the insulation.

Positioned on the opposing side edges of the body are protected sheath cutters comprising outwardly facing blades positioned within opposing shrouded recesses. The blades lie in the plane of the body having an outwardly facing cutting edges spaced inwardly from the outer side edges within the recesses. The blades are partially shrouded by a protective overhanging shoulder creating a notched slot large enough that the sheath and paper liner can be inserted for cutting but yet too small to fit a finger therein.

The wire tool further comprises a self-aligning V-shaped wire stripper for stripping the insulation off the insulated copper wire. The V cutter comprises an elongated triangular opening within the center of the tool body aligned along a center line with a base end adjacent the rotation hole and an apex end toward the base of the tool body and a V-shaped blade with inwardly facing cutting edges exposed within the triangular opening. The V angle of the opening and blades is anywhere from 5 to 30 degrees. The blades lie within the plane of the body and are exposed only enough such that they automatically sever the insulation from a 4 to 14 AWG insulated copper wire without damaging the wire. There is no need to search for wire size. This angle allows the two blade edges to provide the necessary force to overcome the holding force of the insulation for removal of the insulation. Rotation of the V cutter around the wire severs and cuts the entire insulation. Once rotated to sever the insulation, pulling the tool longitudinally relative to the wire strips the insulation off the wire with minimal damage to the wire. The enclosed blade prevents the user from contacting the blades.

Located on the face of the tool between the V-shaped wire stripper and the sheath cutters are visual wire length gauges or lines. The printed, etched or engraved lines are spaced inwardly from either or both side edges, on the front and/or back faces, to provide a quick and simple way of defining the amount of insulation to be stripped from the wire. This helps ensure that the proper length of bare wire for twisting without leaving bare wire exposed from the wire nut. This ensures consistent quality of performance regardless of the different tool operators.

The remaining four features (sheath longitudinal slitter, wire-twist holes, wire nut holes and wire loops holes) are duplicated symmetrically about the centerline of the body but sized for handling various operations for 12/2 and 14/2 wire bundles.

Oval sheath slitting slots extend through the body and are sized to accommodate industry standard 12 gauge and 14 gauge NM wire bundles. A tapered blade extends perpendicular to the plane of the body inside of these slots to longitudinally slice the outside sheath of the wire when the wire is pulled through the slot while minimizing the cable from jamming.

Rosette-shaped arrays of wire-twist holes extending through the body are operative to hold and twist 2 to 5 individual wires so that they interlock when the wires are held stationery and the wire tool is rotated. The diameter of the holes in each array are respectively sized for 12/2 and 14/2 wire diameters ensuring that the copper wire can enter but restrains the entrance of the insulation. This ensures that there is no extra exposed copper wire. When the captured array of wires are rotated with the wire tool body, they interlock so that the twist remains near the end of the twisted wire array. This unique wire-twist hole array allows for a simple twist operation and maximum copper contact and electrical current coupling.

Wire nut holes extending through the body and are configured to engage and retain the respective 12/2 and 14/2 wire nut sizes. Rotating the wire tool engages the wire nuts to the wires which twists and locks. The tool provides needed leverage for tightening the nuts to the wires with the proper torque on a consistent basis.

Wire loop holes are appropriately sized and strategically spaced from the side edges of the tool to provide a wire hole to fold or bend the respective wires into a U-shape with fixed dimensions. Inserting the wire into one the holes and folding the wire over the edge of the device creates a perfect U-shaped loop each time. This U-shape configuration is designed to envelop the screws and be secured by the electrical screw head for electrical connections. The consistent proper length of the U shape helps to ensure proper and safe securing of wire terminations under screw heads and allows for quick visual confirmation of proper fastening. A bottom blind hole is provided to set the length of the wire to a fixed dimension so that wire tail is consistently the proper length for safety once the wire loop is secured under the head of a screw on the device. This also ensures that the mechanical configuration conforms to the regulations and is consistently achievable regardless of the user.

Accordingly, among the objects of the invention are: to provide a tool that the user can easily use to quickly and safely perform multiple wiring tasks in less time; to provide a wire tool that results in less fatigue; to provide a wire tool that results in higher consistency of performance and work resulting in improved quality and less need for rework; to provide a wire tool having a unique rosette-shaped array of wire twist holes for quick and easy twisting of bundles wire sets; to provide a wire tool which is configured for ease in portability, maximum safety, and performance for the user; to provide a wire tool which is rugged and durable, capable of withstanding the abuse of a toolbox; to provide a wire tool that is safe enough to be carried in the user's clothing; to provide a wire tool that is electrically isolated from any conduction wires.

Finally, a major objective of the invention is to provide one single wire tool that effectively replaces the need for carrying and handling a wire stripper, cutting blade, needle nose pliers and flat nose pliers (lineman pliers).

BRIEF DESCRIPTION OF THE DRAWINGS

Exemplary embodiments will now be described further by way of example with reference to the following examples and figures, which are intended to be illustrative only and in no way limiting upon the scope of the disclosure.

FIG. 3 is a rear perspective view thereof, the front and rear views being mirror images of each other;

FIG. 4 is a front view thereof;

FIGS. 8 and 9 are plan views of the internal surfaces of the top and bottom halves of the wire tool body;

FIG. 10 is a cross-sectional view of the lower internal body taken along line 10-10 of FIG. 9;

FIG. 11 is a cross-sectional view of the lower internal body taken along line 11-11 of FIG. 8;

DETAILED DESCRIPTION OF THE EXEMPLARY EMBODIMENTS

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

As will be set forth in greater detail below, the present disclosure provides a unique and novel multi-purpose wire stripping and termination tool 10 that is easy to use, that reduces arm and hand fatigue, that reduces the number of tool changes thus making work faster, that shrouds dangerous knife edges, and that is electrically insulated to protect against electrical shocks.

The exemplary multi-purpose wire tool 10 as illustrated and described herein is capable of slitting and cutting the outer insulation sheath of commonly used 12/2 and 14/2 gauge multi-conductor insulated electrical cabling (Romex™-style cable), as well as stripping, twisting, capping and hooking the individual insulated wires for both rough-in and finish electrical trim work. While specific 12 gauge and 14 gauge wire sizes are described, the disclosure should not be considered limited to any particular wire size as the geometric configurations are universal to any wire dimension so long as the features are appropriately sized.

Figure 1:
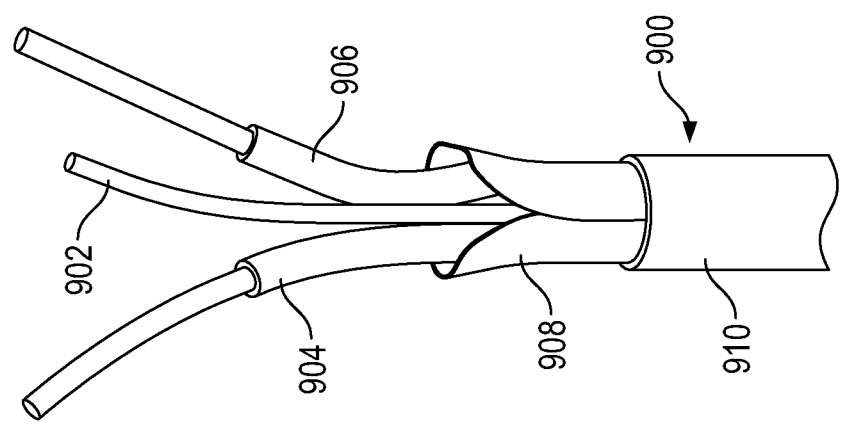
FIG. 1 is a perspective view of a prior art non-metallic sheathed multi-conductor electrical cable.
Figure 5:
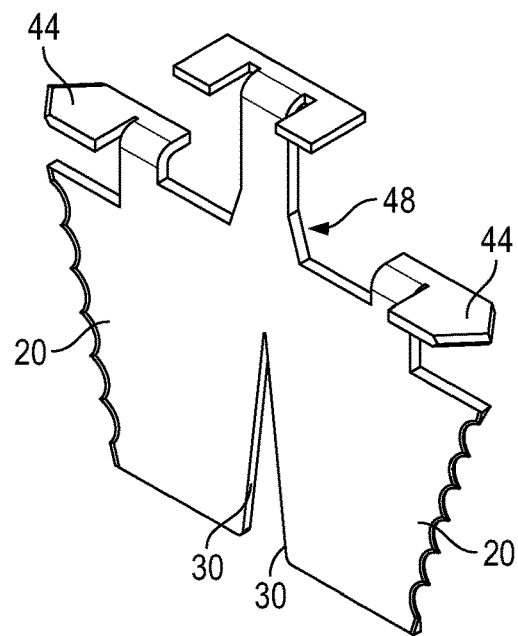
FIG. 5 is a perspective view of the internal blade.
Figure 6:
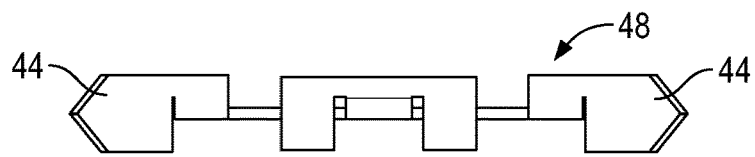
FIG. 6 is a top view thereof.
Figure 7:
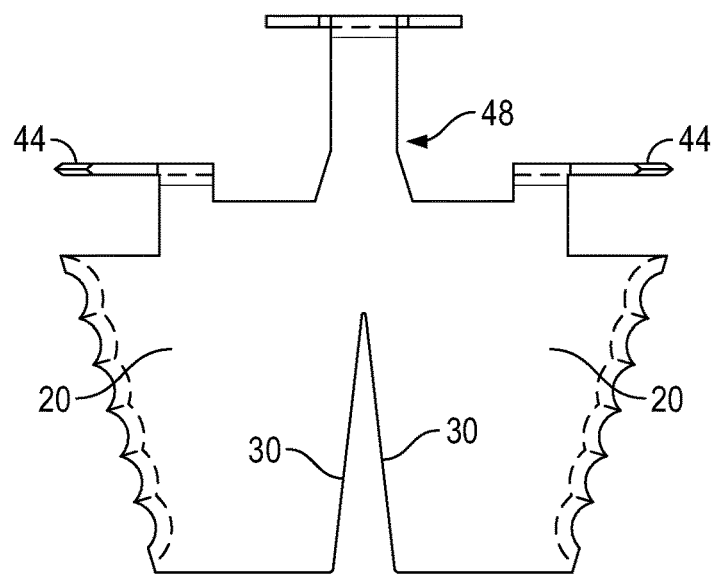
FIG. 7 is a front view thereof.

Referring to FIG. 1, the exemplary wire tool 10 is particularly useful for stripping and terminating conventional Romex™-style non-metallic 2 or 3 conductor wire cabling 900 (generally 12/2 and 14/2 wiring used for residential and commercial electrical systems). For example, a 2-conductor cable 900 of this type generally comprises a bare ground wire 902, an insulated hot wire (black) 904 and an insulated neutral wire (white) 906, wrapped in a paper sheath 908, and further insulated by an external plastic sheath 910.

As noted above, roughing and terminating electrical boxes using these types of cabling 900 consists essentially of 5 basic steps which include slitting the outer plastic sheath or casing 910, cutting the excess sheath 910 and paper wrap 908 from the cable to expose the individual wires 902/904/906, stripping the individual hot and neutral wires 904/906, twisting grouped ground, hot and neutral wires (wire sets) together, capping the twisted wire sets and hooking/looping the terminal ends of lead wires (tails) for connection to one or more electrical devices.

Referring to FIGS. 2-11, an exemplary embodiment of the wire tool 10 may generally comprises a generally triangular-shaped, generally planar body 12 having a circular rotation hole 14 formed adjacent the apex end thereof and further having a plurality of contoured indentations 16 formed at the base end thereof.

The body 12 may be formed from any suitable metal, polymer or composite material with the understanding that use of a metal body or other electrically conductive material, will require an external electrically insulated coating or layer, i.e. such as an anodized coating on aluminum or an external plastic conformal coating (not shown). Additionally, it should be understood that the body 12 may be formed from upper and lower body parts 12a/12b (see FIGS. 8-11) or may be integrally molded as a unitary body structure.

Figure 2:
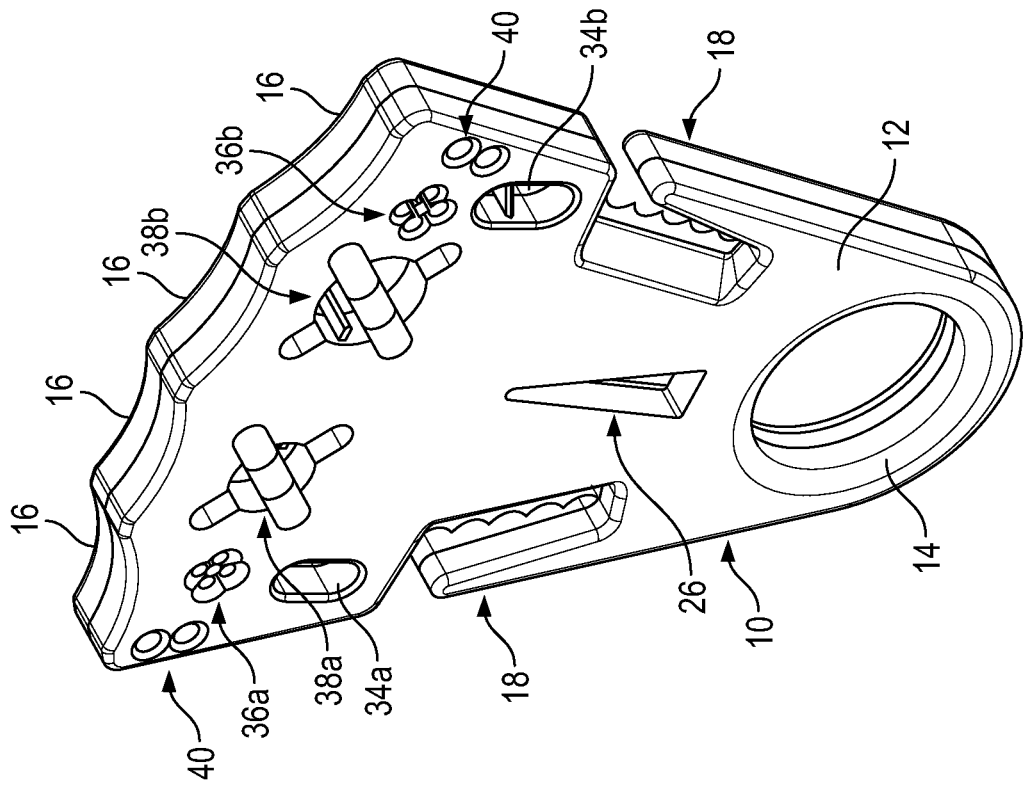
FIG. 2 is a front perspective view of an exemplary embodiment of the wire tool of the present invention.

As best seen in FIGS. 2-4, the rotation hole 14 is strategically sized and placed in the tool body 12 to allow most users to insert a thumb into the hole and to rotate the body with a circular motion to cut, twist, and otherwise engage the wires 902/904/906 to fully utilize the features of the device. The outer edges of the rotation hole 14 are rounded on both outer surfaces to reduce abrasion of the skin during rotation. These operations will become more apparent as further features are discussed herein.

The contoured finger indents 16 are sized and spaced to allow the user's fingers to hold the body 12 securely when the users thumb is in the rotation hole 14 and allow for the user to rotate and rock the assembly to cut, twist, and engage the wires. These finger indentations 16 enable tactile feel that confirms proper holding of the tool for either left-hand or right-hand wire tool operators. They also provide additional gripping area to aid in the removal of the insulation from the wires.

Positioned on the opposing side edges of the body are protected sheath cutters generally indicated at 18 comprising outwardly facing cutting blades 20 positioned within opposing shrouded recesses 22. The blades 20 may be serrated or flat and lie in the plane of the body 12 having outwardly facing cutting edges which are spaced inwardly from the outer side edges of the body within the recesses 22. The blades 20 are partially shrouded by a protective overhanging shoulder 24 creating a notch or slot between the shoulder and the body large enough that the sheath 910 and paper liner 908 can be inserted for cutting but yet too small to fit a finger therein. The inner edges of the recesses 22 are tapered toward the blade 20 for more stable blade edge retention and material run off after cutting. As can be readily ascertained by one skilled in the art, the user will grasp the free ends of the slit sheath and paper, slide them through the notch and simply pull both the tool and sheath to cut.

The wire tool further comprises a self-aligning V-shaped wire stripper generally indicated at 26 for stripping the insulation off the insulated copper wires. The V-shaped cutter 26 comprises an elongated triangular opening 28 within the center of the tool body, preferably aligned along a center line (CL) of the body 12, with a base end adjacent the rotation hole, an apex end toward the base of the tool body and a V-shaped blade 30 with inwardly facing cutting edges exposed within the triangular opening 28. The V angle of the opening 28 and cutting edges is anywhere from 5 to 30 degrees. The blades 30 lie within the plane of the body 12 such that the cutting edges are uniformly exposed along the inner surfaces of the opening whereby they can automatically sever the insulation from a 4 to 14 AWG insulated copper wire without significantly damaging the wire. There is no need to search for a particular wire size hole due to the self-aligning nature of the stripper blade geometry. This angle also allows the two blade edges to provide the necessary force to overcome the holding force of the insulation for removal of the insulation. Rotation of the V cutter 26 around the wire severs and cuts the insulation. Once rotated to sever the insulation, pulling the tool 10 longitudinally relative to the wire strips the insulation off the wire with minimal damage to the wire. The enclosed blade edges prevents the user from contacting the blades and enhances the safety of this step in the process.

As seen in FIG. 4, located on the face of the tool 10 between the V-shaped wire stripper 26 and the sheath cutters 18 are visual wire length gauges or lines 32. These printed, etched or engraved lines 32 are spaced inwardly from either or both side edges, on front or back face, at predefined distances from the edge to provides a quick and simple way of defining the amount of insulation to be stripped from the wire. This helps ensure that the proper length of bare wire for twisting without leaving bare wire exposed from the wire nut or when forming wire loops for termination. This ensures consistent quality of performance regardless of the different tool operators.

The remaining four features (sheath longitudinal slitter 34, wire-twist holes 36, wire nut holes 38 and wire loop holes 40) may be duplicated symmetrically about the centerline CL of the body 12 but are sized differently for handling various terminating operations for 12/2 and 14/2 wire sizes.

Oval sheath slitters 34a/34b extend through the body 12 having oval openings 42a/42b which are sized to accommodate industry standard 12 gauge (34a) and 14 gauge (34b) NM wire cabling 900. A tapered blade 44a/44b extends perpendicular to the plane of the body 12 inside of each these slots 42a/42b to longitudinally slice the outside insulating sheath 910 of the wire cable 900 when the cable 900 is inserted and then pulled through the respective slot 34. When pulled through the slot 42, the tapered blade 44 travels parallel with the internal wires 902/904/906 and therefore does not affect the insulation on the individual inner wires.

Figure 12:
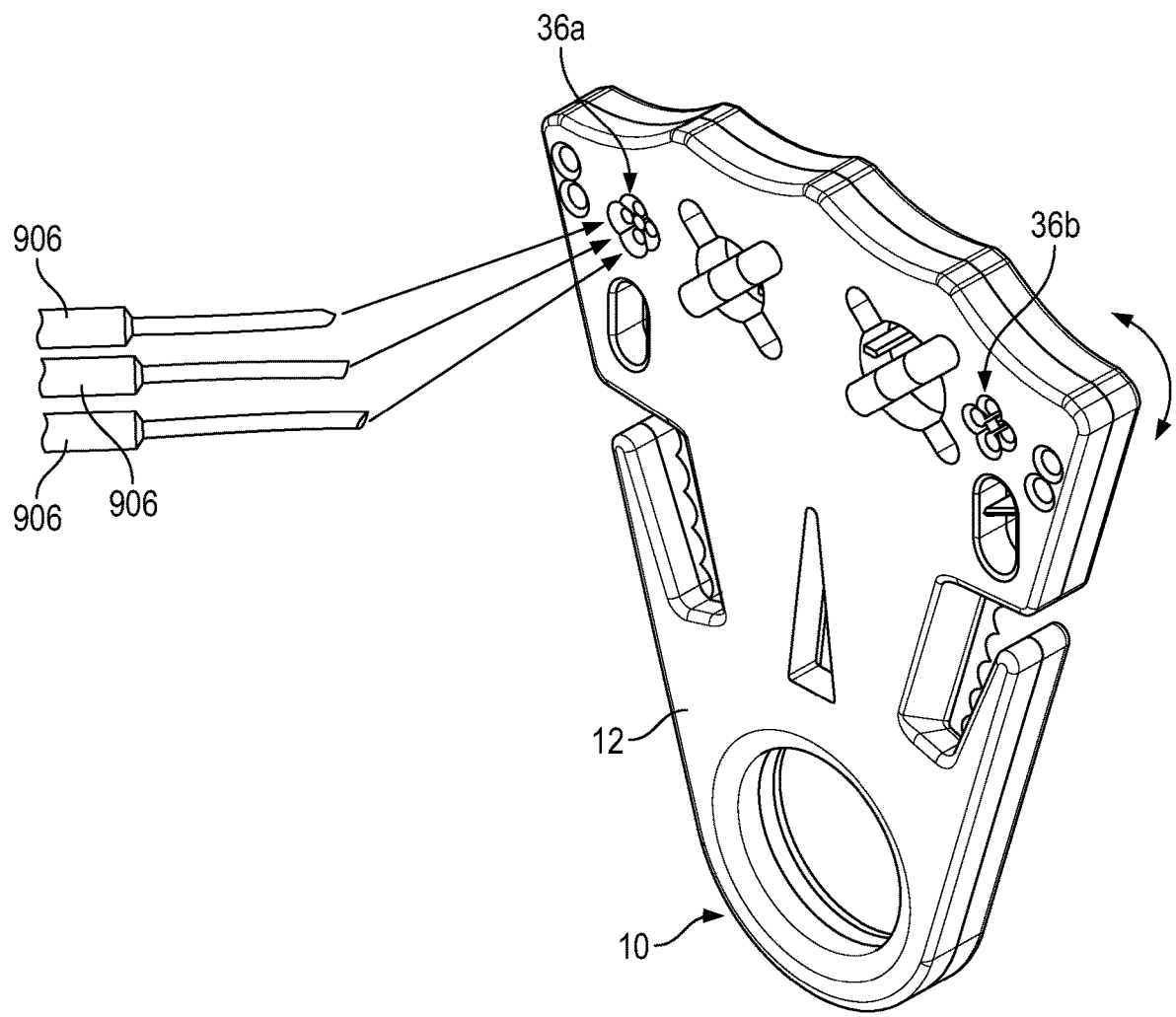
FIG. 12 is an illustration depicting use of the rosette-shaped wire twist holes to twist a wire set into a twisted bundle.
Figure 13:
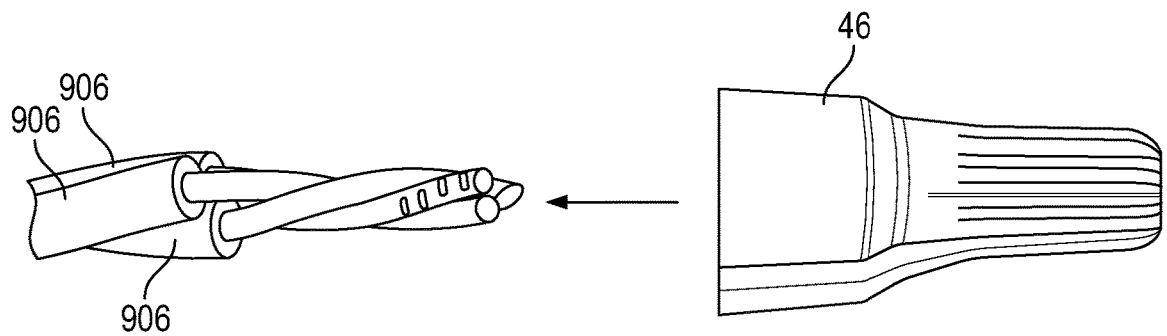
FIG. 13 is an illustration showing capping of the twisted wire set with a conventional wire nut.

A particularly unique feature of the tool 10 are rosette-shaped arrays 36a/36b of wire-twist holes extending through the body 12. These wire twist holes are operative to hold and twist from 2 to 5 individual wires so that they interlock when the wires are held stationery and the wire tool 10 is rotated relative to the stationery wires. Referring briefly to FIGS. 12 and 13, two (2) or more individual wires 906 (up to 5) to be twisted may be inserted into the holes of the appropriate sized array. The diameter of the holes in each array 36a/36b are respectively sized for 12/2 and 14/2 wire diameters ensuring that the copper wire can enter but restrains the entrance of the insulation essentially self-aligning the wire ends. When the array of wires are rotated with the wire tool body 12 (typically clockwise), they interlock so that the twist remains near the end of the twisted wire array (See FIG. 13). This unique wire-twist hole array 36 allows for a simple twist operation and maximum copper contact and electrical current coupling. As noted above, there are two opposing, symmetrically arranged arrays 36a/36b respectively for the 12 and 14-gauge wire sizes.

Opposing wire nut holes 38a/38b extend through the body 12 and are configured to engage and retain the respective 12/2 and 14/2 wire nut sizes. Rotating the wire tool 12 engages the wire nut 46 to the wires which twists and locks (See again FIG. 13). The wire nut hole 38 is generally circular with cross-shaped notches to accommodate wire nut flanges which are typically found on most wire nuts 46. The tool 10 provides needed leverage for tightening the nuts to the wires with the proper torque on a consistent basis.

Wire loop holes 40 are appropriately sized and strategically spaced from the side edges of the tool 10 to provide a wire hole to fold or bend the respective wires into a U-shape with fixed dimensions. As one skilled in the art can appreciate, inserting a wire into one the holes 40 and folding the wire over the edge of the body 12 will create a perfect U-shaped loop each time. This U-shape configuration is designed to envelop the device attachment screws and be secured by the screw head for secure consistent electrical connections. The consistent proper length of the U-shape helps to ensure proper and safe securing of wire terminations under screw heads and allows for quick visual confirmation of proper fastening.

A through hole 40a is provided on each side for varying the length of a loop if needed, and a bottom blind hole is also provided on each side to set the length of the wire to a fixed dimension so that wire tail is consistently the proper length for safety once the wire loop is secured under the head of a screw on the device. This also ensures that the mechanical configuration conforms to the regulations and is consistently achievable regardless of the user.

Referring to FIGS. 5-11, the three sets of cutting blades 20, 30 and 44 as described above may in some embodiments, be integrally formed or stamped as a unitary precision steel blade structure 48 (FIGS. 5-7) and is captured and retained between upper and lower body parts 12a/12b (FIGS. 8-11). The unitary blade structure 48 reduces the number of component parts and greatly simplifies manufacturing and assembly.

Turning to FIGS. 8-11, the body 12 may in some embodiments be formed as upper and lower body parts 12a/12b which are mirror images of each other creating an internal cavity 50 for receiving and capturing the unitary blade structure 48 and forming the symmetrical structural elements as described. The tool 10 may also utilize individual blade elements 20, 30 and 44 which are individually captured within the cavity 50 if so constructed. The upper and lower body parts 12a/12b may be configured for assembly with removable fasteners or may be permanently secured together at assembly with rivets, etc., with the intention that the entire tool 10 be discarded when the blades become worn.

In some embodiments, the unitary blade structure 48 may be overmolded with a polymer or other suitably rigid material to form the tool body 12.

It can therefore be seen that the exemplary embodiments described herein provide a unique and novel multi-purpose wire stripping and termination tool that is easy to use, that reduces arm and hand fatigue, that reduces the number of tool changes thus making work faster, that shrouds dangerous knife edges, and that is electrically insulated to protect against electrical shocks. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A wire tool comprising:
    a body having a generally triangular shape and a circular rotation hole extending therethrough at an apex end thereof,
    a plurality of contoured indentations formed on a peripheral edge of a base end of the body opposite the apex end,
    opposed sheath cutters disposed within recessed notches on opposing side edges of the body,
    a V-shaped self-aligning wire stripper having a base end disposed adjacent the circular rotation hole,
    oval sheath slitters respectively disposed adjacent to the opposing side edges of the body,
    rosette-shaped arrays of wire-twist holes respectively disposed adjacent to the opposing side edges of the body,
    wire nut holes respectively disposed adjacent to the opposing side edges of the body,
    wire loop holes respectively disposed adjacent to the opposing side edges of the body.

2. The wire tool of claim 1 wherein the body is generally planar.

3. The wire tool of claim 2 wherein the circular rotation hole has rounded edges on upper and lower surfaces of the body.

4. The wire tool of claim 2 wherein said opposed sheath cutters comprise outwardly facing blades spaced inwardly from the opposing side edge of the body and positioned within the recessed notches.

5. The wire tool of claim 2 wherein said oval sheath slitters comprise tapered blades extending from one side thereof transverse to a plane of the body.

6. The wire tool of claim 1 wherein the circular rotation hole has rounded edges on upper and lower surfaces of the body.

7. The wire tool of claim 1 wherein said opposed sheath cutters comprise outwardly facing blades spaced inwardly from the opposing side edges of the body and positioned within the recessed notches.

8. The wire tool of claim 1 wherein the V-shaped, self-aligning wire stripper is disposed along a centerline of the body.

9. The wire tool of claim 8 wherein the oval sheath slitters, the wire-twist holes, the wire nut holes and the wire loop holes are respectively grouped by size and symmetrically located on opposing sides of a centerline of the body.

10. The wire tool of claim 1 further comprising visual wire length markings on a surface of said body.

11. The wire tool of claim 1 wherein the oval sheath slitters, the wire-twist holes, the wire nut holes and the wire loop holes are respectively grouped by size and symmetrically located on opposing sides of a centerline of the body.

12. The wire tool of claim 1 wherein the loop holes comprise at least a through hole and a blind hole.

13. The wire tool of claim 1 wherein said body comprises mirror image upper and lower body parts secured together in facing relation, and wherein sheath cutter blades, a V-shaped stripper blade and sheath slitting blades are integrally formed as a unitary blade structure which is captured and retained between said upper and lower body parts.

14. The wire tool of claim 1 wherein sheath cutter blades, a V-shaped stripper blade and sheath slitting blades are integrally formed as a unitary blade structure and said body comprises a unitary body overmolded around said unitary blade structure.

15. The wire tool of claim 1 wherein said body is electrically insulated.

16. A wire tool comprising:
  a body having a generally triangular shape and a circular rotation hole extending therethrough at an apex end thereof,
  a plurality of contoured indentations formed on a peripheral edge of a base end of the body opposite the apex end,
  opposed sheath cutters disposed within recessed notches on opposing side edges of the body,
  a self-aligning wire stripper having a base end disposed adjacent the rotation hole, first and second sheath slitters respectively disposed adjacent to the opposing side edges of the body,
  first and second rosette-shaped arrays of wire-twist holes respectively disposed adjacent to the opposing side edges of the body,
  first and second wire nut holes respectively disposed adjacent to the opposing side edges of the body, and
  wire loop holes respectively disposed adjacent to the opposing side edges of the body.

17. The wire tool of claim 16 wherein said first sheath slitter, said first rosette-shaped array of wire-twist holes and said first wire nut hole are sized for a first wire size, and said second sheath slitter, said second rosette-shaped array of wire-twist holes and said second wire nut hole are sized for a second wire size.

18. A wire tool comprising:
  a body having a generally triangular, planar shape,
  a circular rotation hole extending through the body at an apex end thereof,
  a plurality of contoured indentations formed on a peripheral edge of a base end of the body opposite the apex end, and
  a rosette-shape array of wire-twist holes disposed adjacent to said base end of said body.

19. The wire tool of claim 18 further comprising an oval sheath slitter comprised of a tapered blade extending from one side thereof transverse to a plane of the body.

20. The wire tool of claim 18 further comprising at least one wire loop hole disposed adjacent to a side edge of the body.

21. The wire tool of claim 18 wherein said body is electrically insulated.

* * * * *